Feb. 27, 1973   R. B. MORTON   3,718,301
FILMSTRIP CARTRIDGE
Filed Jan. 1, 1971
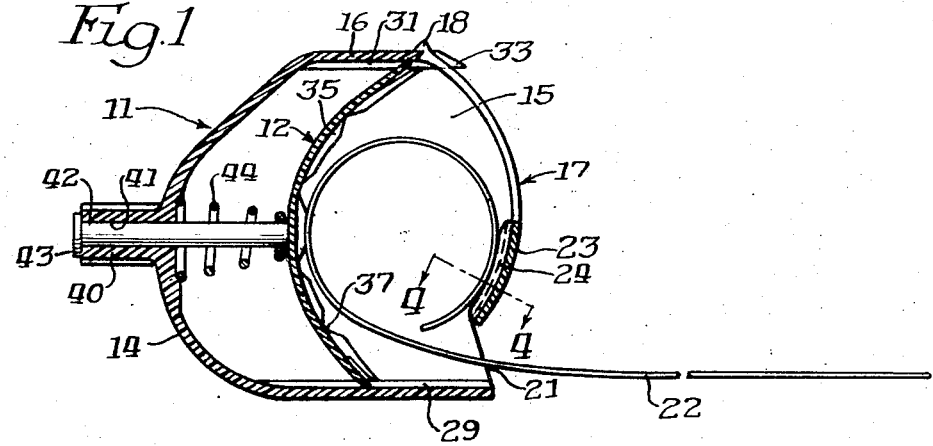
Fig.1
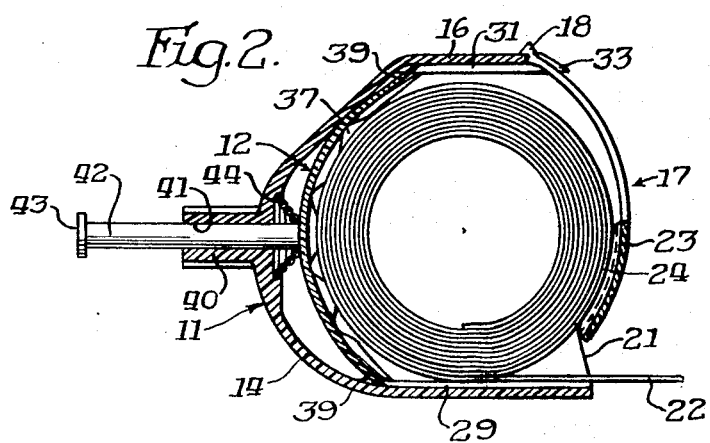
Fig.2
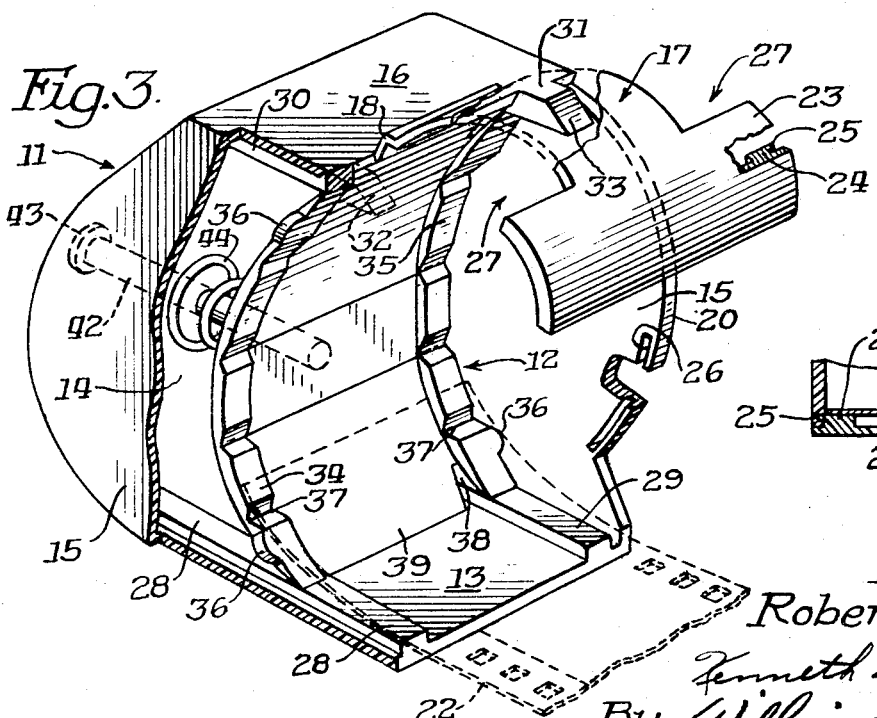
Fig.3
Fig.4
Inventor:
Robert B. Morton

United States Patent Office

3,718,301
Patented Feb. 27, 1973

3,718,301
FILMSTRIP CARTRIDGE
Robert B. Morton, Chicago, Ill., assignor to Bell & Howell Company, Chicago, Ill.
Filed June 1, 1971, Ser. No. 148,668
Int. Cl. C03b 23/02
U.S. Cl. 242—71.1                7 Claims

ABSTRACT OF THE DISCLOSURE

A filmstrip cartridge having a slidable pressure shoe positioned to form a roll of film starting with a predetermined small inside diameter and to maintain this small inside diameter while additional film is being fed into the cartridge only onto the outside diameter of the roll of film for increasing the length of film carrying capacity of a fixed sized cartridge.

---

This invention relates to a filmstrip cartridge and is particularly concerned with simple, inexpensive means of increasing the film carrying capacity of a cartridge of a fixed size by guiding the filmstrip fed into the cartridge into a roll having a controlled relatively small inside diameter.

Heretofore it has been taken for granted that the only way to increase tthe capacity of a film strip cartridge was to increase the dimensions of the cartridge. In Pat. No. 3,280,699, Badalich disclosed the idea of providing a pressure shoe-spring combination that is forced toward the rear wall of the cartridge as the outside diameter of the film roll is increased. Badalich shows a pressure shoe having one end rigidly secured to the top wall of the cartridge and a flexible portion spaced only a short distance from the rear wall of the cartridge. The pressure shoe guides the film into a roll having an inside diameter that is relatively large compared to the inside dimensions of the cartridge. After a few convolutions of the film have been wound into the cartridge, the pressure shoe is forced rearwardly against the action of its spring. The increase in the outside diameter of the roll of film in the cartridge is limited to the initial distance between the pressure shoe and the rear wall of the cartridge, and the total capacity of the cartridge is limited by the relatively large inside diameter of the roll of film.

In accordance with the present invention, a pressure shoe is slidably mounted in the cartridge housing, and a spring urges the pressure shoe toward the front cover of the cartridge. The yieldable mounting of the pressure shoe permits the pressure shoe to move within the housing, and when the cartridge is empty the linear distance between the pressure shoe and the front cover of the cartridge is relatively small. The arcuate curvature of the pressure shoe guides film fed into the cartridge into a roll of relatively small inside diameter. The spring pressure against the back of the pressure shoe is strong enough to hold the roll of film against any unwinding that would increase the inside diameter of the roll. The pressure shoe is forced backwardly toward the back wall of the cartridge against the action of its spring only as the outside diameter of the roll is increased by feeding additional film into the cartridge.

The object of the present invention is to provide a filmstrip cartridge with the capability of increasing the length of film carrying capacity without changing the size of the cartridge.

Another object of the present invention is to provide a filmstrip cartridge with the capability of permitting coils of film within the cartridge to rotate as a unit as additional film is fed into the cartridge and thus prevent film damage by minimizing shifting of one film surface relative to another.

Suitable structure by means of which the above-noted and other advantages of the invention are attained will be fully described in the following specification, taken in conjunction with the accompanying drawings showing a preferred embodiment of the invention, in which:

FIG. 1 is a cross-sectional view of a cartridge with the leading end of the filmstrip being fed therein;

FIG. 2 is a view similar to FIG. 1, with a maximum roll of film housed therein;

FIG. 3 is an enlarged perspective view of the cartridge with portions broken away to facilitate illustration; and FIG. 4 is a cross-sectional view taken in the plane indicated by the line 4—4 of FIG. 1.

Referring to the drawings, this particular filmstrip cartridge comprises an open front housing 11 and an arcuate pressure shoe 12 slidably mounted within the housing 11, each of which may be formed from a suitable plastic material. The housing 11 comprises a flat bottom wall 13, an arcuate back wall 14, a pair of side walls 15, a flat top wall 16 parallel to the bottom wall 13, and a front cover 17 connected to the front end of the top wall 16 by an integral flexible hinge 18 and extending across a portion of the open front of the housing 11.

The front cover 17 is curved to conform to the curvature of the front edges 20 of the side walls 15 and terminates in spaced relationship to the front end of the bottom wall 13 to provide an opening 21 for entrance and exit of a strip of film 22 into and out of the housing 11. The free end portion 23 of the cover 17 completely traverses the space between the side walls 15, and is provided on its inner surface with a protuberance 24 adjacent each longitudinal edge. Each protuberance 24, has an outwardly disposed lateral flange 25 spaced from the inner surface of the cover 17 and adapted to snap into an arcuate groove 26 on the inner surface of each side wall 15 to hold the cover 17 in closed position. The width of the cover 17 is reduced rearwardly of the free end portion 23 to provide each longitudinal edge portion of the cover 17 with a space 27 dimensioned to permit engagement of the longitudinal edges of the film within the cartridge by any suitable feed means (none shown).

The bottom wall 13 has a pair of longitudinal guide rails 28, 29 on its inner surface adjacent each side wall, and the top wall 16 has similar guide rails 30, 31 parallel to the guide rails 28, 29, respectively. The guide rails 28, 29 and 30, 31 are preferably integral with the walls 13 and 16 from which they project. The guide rails 28, 29 and 30, 31 engage the longitudinal edge portions of the filmstrip 22 and protect the film 22 by keeping its longitudinal center portion out of contact with the inner surfaces of the top and bottom walls 16 and 13 of the housing 11. The front ends of the guide rails 30, 31 have extensions 32, 33 that project forwardly beyond the front end of the top wall 16 and past the hinge 18 for a purpose hereinafter disclosed.

The arcuate pressure shoe 12 has integral ribs 34, 35 on its front surface adjacent its opposite longitudinal edges. The ribs 34, 35 are each provided with ears 36 projecting laterally from their outer edges to help keep the pressure shoe centered when it is moved within the housing 11. The pressure shoe 12 is flexible, and each of the ribs 34, 35 has a plurality of transverse notches 37 at longitudinally spaced intervals to permit arcuate flexibility of the pressure shoe 12. The flexibility of the pressure shoe 12 permits it to conform approximately to the circumference of the roll of film 22 in the cartridge as the outside diameter of the roll changes.

The end ribs of the pressure shoe are slidably engaged with the guide rails 28, 30, and 29, 31. Both ends of the pressure shoe 12 are provided with longitudinal slits 38 to define end portions 39. One end portion 39 fits between the guide rails 28, 29 on the bottom wall 13, and the other end portion 39 fits between the guide rails 30, 31 on the top wall 16. The two end portions 39 lie against the recessed walls 13 and 16 between the guide rails 28, 29 and 30, 31. The four short rib end portions located outwardly from the longitudinal slits 38 lie against the guide rails 28, 29 and 30, 31. This arrangement provides a suitable tapered transition path between the housing and the pressure shoe for the film strip as it initially enters, leaves, or revolves within the cartridge.

The back wall 14 has an integral centrally disposed cylindrical boss 40 extending rearwardly therefrom. The boss 40 has an axial bore 41 extending throughout its length. A plunger 42 having one end rigidly secured to the pressure shoe 12 projects through the bore 41 and has an enlarged head 43 at its free end to limit the forward movement of the plunger 42. The plunger 42, like the housing 11 and pressure shoe 12, may be formed of a suitable plastic material. A compression spring 44 coiled around the plunger 42 between the back of the pressure shoe 12 and the inside back wall 14 of the housing 11 urges the pressure shoe 12 toward the front cover 17 within the housing 11.

When the housing 11 is empty, the position of the pressure shoe 12 being well forward of the back wall 14 causes the leading end of a strip of film 22 fed into the opening 21 of the housing 11 to be wound into a roll of a predetermined small diameter between the pressure shoe 12 and the front cover 17. The guide rails 28, 29 direct the leading end of the filmstrip 22 to the ribs 34, 35, and the ribs 34, 35 guide the filmstrip 22 toward the top wall 16. The extensions 32, 33 prevent the leading end of the filmstrip 22 from catching on the hinge 18. When the leaking end of the filmstrip 22 engages the inner surface of the front cover 17, it moves downwardly to engage the inner surface of the following portion of the filmstrip 22 to complete the first convolution of the roll. The resilience of the film imparts to the coiled film a tendency to unwind, but the compression spring 44 exerts sufficient force against the pressure shoe 12 to hold the coiled film 22 against unwinding and thereby maintains the relatively predetermined small inside diameter of the roll of film 22 as it is wound into roll formation in the cartridge. As additional film 22 is fed into the cartridge and the outer diameter of the roll increases, the roll forces the pressure shoe 12 rearwardly against the force of the spring 44 until the spring 44 is comparatively tightly compressed. The pressure shoe is slidably displaced with sufficient ease to permit the coils of film to rotate as additional film is fed into the cartridge. The rotating of the coils of film prevents damaging of the film surfaces by minimizing shifting of one film surface relative to another.

Preferably the coils of the spring 44 decrease in diameter from one end to the other so that the smaller coils fit within the larger coils and the spring 44 is substantially flat when fully compressed.

Although I have described a preferred embodiment of the invention in considerable detail, it will be understood that the description thereof is intended to be illustrative, rather than restrictive, as many of the structural details may be modified or changed without departing from the spirit or scope of the invention.

What is claimed is:
1. A filmstrip cartridge comprising:
a substantially enclosed housing having an opening therein for feeding film in and out of the cartridge; and
a pressure shoe slidably mounted in said housing, said pressure shoe having a first position cooperating with said housing for forming a first coil of film of a predetermined diameter as the film is fed into said housing, said pressure shoe being slidably displaced from said first position relative to said housing by the film as additional film is fed into said housing and onto the outside of said first coil of film for maintaining a substantially constant inside diameter as the size of the roll of film changes.

2. A filmstrip cartridge as defined in claim 1 wherein said pressure shoe includes means for urging said pressure shoe toward said first position.

3. A filmstrip cartridge as defined in claim 1 wherein said pressure shoe is arcuately flexible.

4. A filmstrip cartridge as defined in claim 1 wherein said pressure shoe is flexible and further includes a spring operable to urge said pressure shoe against the roll of film to maintain said predetermined diameter of said first coil of film as the size of the roll of film changes.

5. A filmstrip cartridge as defined in claim 1 wherein said pressure shoe includes a plunger attached thereto, said housing having means for slidably supporting said plunger for guiding the displacement of said pressure shoe.

6. A filmstrip cartridge as defined in claim 1 wherein said housing includes a pair of laterally spaced rails and said pressure shoe includes a pair of laterally spaced ribs in alignment with said spaced rails for supporting the film near its edge as the film is fed in and out of said housing.

7. A filmstrip cartridge as defined in claim 1 wherein said pressure shoe slidably displaces from said first position to permit said coil of film to rotate as additional film is fed into said housing thereby minimizing shifting of one film surface relative to another.

References Cited
UNITED STATES PATENTS

| | | | |
|---|---|---|---|
| 3,288,389 | 11/1966 | Gersch | 242—71.1 |
| 3,333,785 | 8/1967 | Baur | 242—71.1 |
| 3,280,699 | 10/1966 | Badalich | 353—57 |

GEORGE F. MAUTZ, Primary Examiner

E. J. McCARTHY, Assistant Examiner

U.S. Cl. X.R.

242—19.7